United States Patent
St. Clair et al.

(10) Patent No.: US 7,297,741 B2
(45) Date of Patent: *Nov. 20, 2007

(54) PRESSURE SENSITIVE ADHESIVES FROM HIGH MOLECULAR WEIGHT BLOCK COPOLYMERS HAVING A HIGH FRACTION OF DIBLOCK COPOLYMER

(75) Inventors: David J. St. Clair, Houston, TX (US); Willem C. Vonk, Amsterdam (NL); Cornelis Martinus van Dijk, Amsterdam (NL)

(73) Assignee: Kraton Polymers U.S. LLC, Houston, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 10/880,055

(22) Filed: Jun. 29, 2004

(65) Prior Publication Data

US 2005/0234195 A1    Oct. 20, 2005

(30) Foreign Application Priority Data

Apr. 14, 2004  (EP) ................... 0410527

(51) Int. Cl.
  *C08L 53/02*  (2006.01)
(52) U.S. Cl. ................ 524/505; 525/89; 428/517; 428/518
(58) Field of Classification Search ............... 525/89; 428/517, 518
  See application file for complete search history.

(56) References Cited

U.S. PATENT DOCUMENTS

| | | |
|---|---|---|
| 3,519,585 A | 7/1970 | Miller |
| 3,681,190 A | 8/1972 | Dahiquist |
| 3,787,531 A | 1/1974 | Dahiquist et al. |
| 4,080,348 A | 3/1978 | Korpman |
| 4,096,203 A | 6/1978 | St. Clair |
| 5,151,309 A | 9/1992 | Dollinger |
| 5,274,036 A | 12/1993 | Korpman et al. |
| 5,290,842 A | 3/1994 | Sasaki et al. |
| 5,420,203 A * | 5/1995 | Dillman et al. ............ 525/98 |
| 5,587,237 A | 12/1996 | Korpman et al. |
| 5,719,226 A | 2/1998 | Kegley |
| 5,760,135 A | 6/1998 | Korpman et al. |
| 5,773,496 A | 6/1998 | Grubba |
| 5,863,977 A | 1/1999 | Fischer et al. |
| 6,150,439 A | 11/2000 | Keiichi et al. |
| 6,172,156 B1 * | 1/2001 | Lindquist et al. ........... 524/505 |
| 6,291,583 B1 * | 9/2001 | Komatsuzaki et al. ........ 525/95 |
| 6,503,620 B1 | 1/2003 | Xie et al. |
| 6,534,593 B1 * | 3/2003 | Komatsuzaki et al. ........ 525/89 |

FOREIGN PATENT DOCUMENTS

| | | |
|---|---|---|
| DE | 203 10 484 | 11/2003 |
| EP | 1 348 737 | 10/2003 |
| GB | 2 318 121 | 4/1998 |
| WO | 97/30844 | 8/1997 |
| WO | 00/24840 | 4/2000 |
| WO | 02/26889 | 4/2002 |

OTHER PUBLICATIONS

McKay K.W., et al: "The Influence of Styrene-Butadiene Diblock Copolymer on Styrene-Butadiene-Styrene Triblock Copolymer Viscoelastic Properties and Product Performance" Journal of Applied Polymer Science, John Wiley and Sons Inc., New York. vol. 56, No. 8, May 23, 1995, pp. 947-958.

* cited by examiner

Primary Examiner—Jeffrey Mullis
(74) Attorney, Agent, or Firm—Michael A. Masse

(57) ABSTRACT

The present invention relates to pressure sensitive adhesive compositions prepared from novel anionic block copolymers of aromatic vinyl compounds and conjugated dienes. The block copolymers are a mixture of a high molecular weight linear and/or radial block copolymer component (SBC1 and/or SBC2), and a diblock copolymer component (D1). The block copolymer may be combined with other block copolymers, tackifying resins, oils and other components to form the adhesives of the present invention. The pressure sensitive adhesives of the present invention maintain their performance at elevated temperatures and fail cohesively making them particularly useful for die-cuttable label applications. The pressure sensitive adhesives compositions may also comprise ester plasticizers typically used for PVC and thus make adhesives particularly suitable for PVC film labels and decals.

22 Claims, No Drawings

PRESSURE SENSITIVE ADHESIVES FROM HIGH MOLECULAR WEIGHT BLOCK COPOLYMERS HAVING A HIGH FRACTION OF DIBLOCK COPOLYMER

BACKGROUND OF THE INVENTION

1. Field of the Invention

This invention relates to pressure sensitive adhesive (PSA) compositions prepared from novel anionic block copolymers of aromatic vinyl compounds and conjugated dienes. The invention further relates to die-cuttable labels and decals formed using the pressure sensitive adhesive composition.

2. Background of the Art

Pressure sensitive adhesives comprising styrenic block copolymers are well known.

The block structure of the polymer gives adhesives having high shear and peel strengths and high upper service temperatures. However, the high strength of such adhesives is not suitable for all applications. For instance, formulators would like the ability to adjust the cohesive strength of an adhesive based on a block copolymer to improve the die-cutability of PSA labels or to achieve a cohesive failure mode in a peel test.

Traditional approaches to improve the die-cutability of block copolymer based adhesives have been to reduce the cohesive strength by incorporation of diblock copolymer as taught in U.S. Pat. No. 4,096,203. Other approaches are to include low molecular weight, liquid rubbers as taught in U.S. Pat. No. 5,274,036. These approaches do serve to reduce the cohesive strength of the adhesive formulations. However, with the use of conventional block copolymer compositions, the high temperature performance is deleteriously reduced as the cohesive strength is lessened.

We have found that certain new and novel polymers will allow the preparation of improved pressure sensitive adhesive compositions. In particular, adhesives containing the presently claimed high molecular weight, low coupled (i.e., high diblock fraction) polymer composition maintain their high temperature performance while providing adhesives which fail cohesively. This heretofore unattainable balance of properties allows the variation of peel strength, where the peel fails cohesively, independently of the high temperature performance of the adhesive. This is particularly useful in the construction of die-cuttable adhesives. In this application, the adhesive must have low cohesive strength so it can be cut into the desired shape and the unwanted matrix removed, but it must also maintain its high temperature performance to prevent adhesive bleed into a label facestock paper. The present invention addresses this need.

In addition, the pressure sensitive adhesive composition of the present invention may comprise ester-type plasticizers typically used as PVC plasticizers. This behavior is unexpected for adhesives based on styrenic block copolymers since the ester-type plasticizers generally segregate into the styrenic endblocks and destroy the strength of the adhesive. Surprisingly, we have found the pressure sensitive adhesive compositions of the present invention able to tolerate relatively high levels of ester-type plasticizers. This makes the invention further useful as an adhesive for PVC labels and decals.

SUMMARY OF THE INVENTION

In one aspect of the present invention we have discovered a novel pressure sensitive adhesive composition comprising from 10 to 45 parts by weight of a block copolymer composition having (i) a high molecular weight linear and/or radial multiblock copolymer component along with (ii) a lower molecular weight diblock component, 40 to 70 parts by weight of a tackifier, 5 to 40 parts by weight of an extending oil, and from 0 to 15 parts by weight of an ester-type plasticizer. The block copolymer composition comprises from 5 to 70% by weight of a first block copolymer which is a linear styrenic block copolymer (SBC1) having an apparent molecular weight greater than 250,000 or a radial styrenic block copolymer (SBC2) having apparent arm molecular weights greater than 125,000 or mixtures thereof, and a second block copolymer (D1) which is a styrenic diblock copolymer having an apparent molecular weight of 120,000 to 250,000.

In another aspect the present invention is a die-cuttable label comprising the pressure sensitive adhesive composition and a label stock backing where the backing can be paper or a synthetic film.

In yet another aspect the present invention is a die-cuttable decal comprising the pressure sensitive adhesive composition and a plasticized poly(vinyl chloride) film.

The pressure sensitive adhesive compositions of the present invention have a unique balance of high temperature strength and room temperature peel properties. As such they are particularly useful as die-cuttable label and decal adhesives. In general, they will be useful for any application where the failure mode of the adhesive in a peel test will be varied independently of the high temperature strength. Furthermore, the adhesive composition maintains its strength even in the presence of modest amounts of ester plasticizers. As such, the adhesive compositions of the present invention are useful for plasticized PVC labels and decals.

DETAILED DESCRIPTION OF THE PREFERRED EMBODIMENTS

One essential component of the present invention is the novel block copolymer composition. The novel block copolymer composition comprises a high molecular weight styrenic block copolymer elastomer combined with a lower molecular weight polymer, preferably a diblock polymer. Preferably, the styrenic block copolymer elastomer has an apparent molecular weight in the range of 250,000 to 800,000 if said copolymer is a linear polymer, or in the range of 500,000 to 1,500,000 if said copolymer is a branched or star-shaped polymer. Most preferably the styrenic block copolymer elastomer constituents are selected from the group consisting of

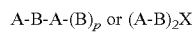

A-B-A-(B)$_p$ or (A-B)$_2$X wherein A represents the polymer block substantially made of an aromatic vinyl compound, typically a polystyrene block; B represents a polymer block substantially made of a conjugated diene, typically a polybutadiene block, p is 0 or 1 and X is the residue of a coupling agent.

These preferred styrenic block copolymer elastomer constituents are selected from a larger group of styrenic block copolymers, that all may be used in the compositions of the present invention, consisting of those of the formulae

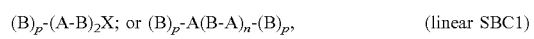

(B)$_p$-(A-B)$_2$X; or (B)$_p$-A(B-A)$_n$-(B)$_p$,  (linear SBC1)

((B)$_p$(A-B)$_n$)$_m$X  (radial SBC2)

wherein A, B, p and X have the meaning set out above, n is an integer greater than or equal to 1, and m is an integer greater than 2.

The expression "substantially made" as used herein means that the polymer block referenced consists primarily of the indicated monomer to such an extent that the essential character of the polymer block is preserved. In the case of the A block "substantially made" means that sufficient aromatic vinyl compound is used, for instance at least 50% by weight, to provide a hard block A having a glass transition temperature of greater than 25° C. In the case of the block B the expression "substantially made" means that sufficient conjugated diene is used, for instance at least 70% by weight, to provide an elastomer block having a glass transition temperature below 25° C.

The content of the aromatic vinyl compound comprising the A block in the styrenic block copolymer is from 10 to 50% by weight, preferably from 15 to 40% by weight.

The vinyl aromatic compound may be selected from compounds having 8 to 18 carbon atoms per molecule. For instance, some representative examples thereof include: styrene; 1-vinylnaphthalene; 4-methylstyrene; 3,5-diethylstyrene; 4-propylstyrene; 2,4,6-trimethylstyrene; 4-phenylstyrene; 2-ethyl,4-benzylstyrene; 2,3,4,5-tetraethylstyrene; 3-ethyl-1-vinylnaphthalene; alpha-methylstyrene, and the like. Preferred examples comprise 4-methylstyrene, styrene and mixtures thereof, styrene being most preferred. Compounds that may be copolymerized and form part of the A block(s) maybe selected from the conjugated dienes hereafter, and other anionically polymerizable, ethylenically unsaturated compounds, such as vinylcyclohexane, methylmethacrylate and the like. Most preferably each polymer block A is a polystyrene block.

Block B is preferably made from butadiene, isoprene or mixtures thereof. Conjugated dienes that can be used, preferably having from 4 to 12 carbon atoms per molecule, further include 2,3-dimethyl-1,3-butadiene, piperylene, 3-butyl-1,3-octadiene, phenyl-1,3-butadiene, and the like. Said block(s) may also comprise other monomers, such as the vinyl aromatic compounds mentioned herein above. Most preferably block B is a polybutadiene block.

As is known, butadiene (and other conjugated dienes) may polymerize in 1,4-addition manner and/or 1,2-addition manner. The latter results in pendant vinyl groups. It is known in the art to use styrenic block copolymers having relatively high vinyl content, e.g. up to 70% and higher (based on the conjugated diene) by polymerizing the conjugated diene monomer in the presence of a polar cosolvent and/or at a relatively cool polymerization temperature. In producing the polymer block (B) under ordinary conditions a vinyl content of less than 25% is obtained. Both high vinyl and ordinary vinyl styrenic block copolymers may be used.

The block copolymer elastomer and the second block copolymer may be used in relative amounts of 15 to 70% by weight (SBC1 and/or SBC2) and 85 to 30% by weight (D1), respectively, but preferably in relative amounts 20 to 50% by weight (SBC1 and/or SBC2) and 80 to 50% by weight (D1). One of ordinary skill in the art will understand that the performance of the pressure sensitive adhesive compositions will vary and that the optimal performance for any application will be found by varying the relative amounts within the aforementioned range.

Depending on their method of preparation, these block copolymers are known to comprise diblock copolymers of formula A-B in various amounts. Indeed, in coupling reactions, the diblock copolymers of formula A-B have the same molecular weight as the arms in the coupled polymer. The co-produced diblock copolymer of formula A-B may be the second block copolymer (D1) component of the polymer composition, provided it has an apparent molecular weight in the range of from 10,000 to 250,000 and is present in an amount in the range of 85 to 30% by weight basis the polymer composition. This is the preferred embodiment. On the other hand, the second block copolymer (D1) may be a separate polymer, selected from the polymers mentioned herein before. The second block copolymer (D1) may also be a diblock copolymer produced independent of the preparation of the block copolymer elastomer (SBC1 and/or SBC2).

The polymer composition that has been found to be most suitable for the present application is a high molecular weight styrene-butadiene-styrene coupled block copolymer with a large amount of diblock, with the following characteristics:

1. styrene content in the range of 25–40%, preferably about 30% by weight;
2. diblock molecular weight 180,000–215,000, preferably about 200,000;
3. diblock content 70–85%, preferably 80% by weight (which corresponds with a coupling efficiency of 15–30, preferably 20%); and
4. having a linear structure (manufactured with a difunctional coupling agent), having an apparent molecular weight (SBS) of 30,000–40,000//300,000–350,000//30,000–40,000, preferably 36,000–328,000–36,000.

The term "apparent molecular weight", as used throughout the present specification, means the molecular weight, as measured by Gel Permeation Chromatography (GPC), relative to commercially available poly(styrene) calibration standards (according to ASTM D6474-99). One skilled in the art can readily convert "apparent" molecular weight to "real" or "true" molecular weight according to known compositionally dependent conversions. Alternately, in the case of coupled block copolymers having styrene endblocks, one may calculate the true or real molecular weight from the polystyrene content as measured by 1H NMR and the styrene endblock molecular weights as measured by GPC. For example, a styrene/butadiene block copolymer having the structure $(A-B)_2X$ with apparent molecular weight of $(36,000–164,000)_2X$ and 30% weight bound styrene will have a real molecular weight of $(36,000–84,000)_2X$.

One of the components used in the adhesives and sealants of the present invention is a tackifying resin. Tackifying resins include both A block compatible resins and B block compatible resins. The A block compatible resin may be selected from the group consisting of coumarone-indene resin, polyindene resin, poly(methyl indene) resin, polystyrene resin, vinyltoluene-alphamethylstyrene resin, alphamethylstyrene resin and polyphenylene ether, in particular poly(2,6-dimethyl-1,4-phenylene ether). Such resins are e.g. sold under the trademarks "HERCURES", "ENDEX", "KRISTALEX", "NEVCHEM" and "PICCOTEX". Resins compatible with the B block maybe selected from the group consisting of compatible $C_5$ hydrocarbon resins, hydrogenated $C_5$ hydrocarbon resins, styrenated $C_5$ resins, $C_5/C_9$ resins, styrenated terpene resins, fully hydrogenated or partially hydrogenated $C_9$ hydrocarbon resins, rosin esters, rosin derivatives and mixtures thereof. These resins are sold under the trademarks "REGALITE", "REGALREZ", "ESCOREZ", "WINGTACK" and "ARKON".

The amount of tackifier varies from about 0 to about 700 parts by weight per hundred parts by weight block copolymer, preferably about 100 to about 700 parts by weight per hundred parts block copolymer. In the present invention, in which the amount of block copolymer is from 10 to 45 parts by weight, the preferred amount of tackifier corresponds to 40 to 70 parts by weight, and the most preferred amount is from 45 to 60 parts by weight.

Another one of the components used in the adhesives of the present invention is an extending oil. Especially preferred are the types of oils that are compatible with the B blocks. While oils of higher aromatic content are satisfactory, those petroleum-based white oils having less than 50% aromatic content are preferred. Such oils include both paraffinic and naphthenic oils. The oils should additionally have low volatility, preferably having an initial boiling point above about 500° F.

Examples of alternative extending oils which maybe used in the present invention are oligomers of randomly or sequentially polymerized styrene and conjugated diene, oligomers of conjugated diene, such as butadiene or isoprene, liquid polybutene-1, and ethylene-propylene-diene rubber, all having a number average molecular weight in the range from 300 to 35,000, preferable less than about 25,000 molecular weight.

The amount of oil employed varies from about 0 to about 400 parts by weight per hundred parts by weight block copolymer, preferably about 10 to about 400 parts by weight per hundred parts block copolymer. In the present invention, in which the amount of block copolymer is from 10 to 45 parts by weight, the preferred amount of extending oil corresponds to 5 to 40 parts by weight, and the most preferred amount is from 10 to 30 parts by weight.

Another one of the components used in the adhesives of the present invention is an ester-type plasticizer. Especially preferred are organic ester plasticizers typically employed in poly(vinyl chloride) (PVC) flexibilization. These plasticizers may be compatible with either the A blocks or the B blocks. Examples of plasticizers useful in the present invention are dioctyl phthalate (DOP), di-2-ethylhexyl phthalate (DEHP), diisononyl phthalate (DINP), diisodecyl phthalate (DIDP), and butyl benzyl phthalate (BBP). The preferred plasticizer is butyl benzyl phthalate and is obtainable as Santicizer 160 from Ferro Corp.

The amount of ester-type plasticizer varies from 0 to 150 parts by weight per 100 parts by weight of the block copolymer. In the present invention, in which the amount of block copolymer is from 10 to 45, the preferred amount of plasticizer corresponds to 0 to 15 parts by weight, and the most preferred amount is from 5 to 15 parts by weight.

Various types of fillers and pigments can be included in the adhesive or sealant formulations to color the adhesive, increase stiffness and reduce cost. Suitable fillers include organic compounds such as carbon black and hydrocarbon waxes and inorganic minerals such as calcium carbonate, clay, talc, silica, zinc oxide, titanium dioxide and the like. The amount of filler usually is in the range of 0 to 30% weight based on the polymer portion of the formulation, depending on the type of filler used and the application for which the adhesive is intended.

The compositions of the present invention maybe modified further with the addition of other polymers in particular polyolefins such an polyethylenes and polypropylenes, reinforcements, antioxidants, stabilizers, fire retardants, anti blocking agents, lubricants and other rubber and plastic compounding ingredients without departing from the scope of this invention. Such components are disclosed in various patents including U.S. Pat. No. 3,239,478; and U.S. Pat. No 5,777,043, the disclosures of which are incorporated by reference.

Regarding the relative amounts of the various ingredients, this will depend in part upon the particular end use and on the particular block copolymer that is selected for the particular end use. Table A below shows some notional compositions that are included in the present invention. The amounts are expressed in parts by weight.

TABLE A

| Application | Ingredients | Composition, Parts by weight |
|---|---|---|
| Adhesive | Block Copolymer Composition | 100 |
| | Tackifying Resin | 25 to 300 |
| | Extending Oil | 0 to 200 |
| Hot melt adhesive (preferred range) | Block Copolymer Composition | 100 |
| | Tackifying Resin | 75 to 200 |
| | A Block Resin | 0 to 50 |
| | Extending Oil | 0 to 150 |
| Solvent based adhesive (excluding solvent) | Block Copolymer Composition | 100 |
| | Tackifying Resin | 25 to 300 |
| | Oil | 0 to 100 |
| Pressure sensitive adhesive | Block Copolymer Composition | 100 |
| | Styrene/Isoprene Block Copolymer | 25 to 300 |
| | Tackifying Resin | 50 to 500 |
| | Oil | 0 to 200 |
| Construction adhesive or sealant (excluding solvent) | Block Copolymer Composition | 100 |
| | Tackifying Resin | 0 to 200 |
| | A Block Resin | 0 to 200 |
| | Calcium Carbonate | 100 to 800 |

If the adhesive composition is to be applied from solvent solution, the organic portion of the formulation will be dissolved in a solvent or blend of solvents. Aromatic hydrocarbon solvents such as toluene, xylene or Shell Cyclo Sol 53 are suitable. Aliphatic hydrocarbon solvents such as hexane, naphtha or mineral spirits may also be used. If desired, a solvent blend consisting of a hydrocarbon solvent with a polar solvent can be used. Suitable polar solvents include esters such as isopropyl acetate, ketones such as methyl isobutyl ketone, and alcohols such as isopropyl alcohol. The amount of polar solvent used depends on the particular polar solvent chosen and on the structure of the particular polymer used in the formulation. Usually, the amount of polar solvent used is between 0 and 50% wt in the solvent blend.

Alternatively, the adhesive composition may be applied as a hot melt. Various methods of melt mixing are known and any method that produces a homogeneous composition without significant degradation is suitable. Typically, all components are combined and mixed in suitable mixing equipment like a sigma-blade mixer or a twin screw extruder at temperatures ranging from 130 to 200° C. until a homogeneous composition is obtained, usually less than 3 hours. The hot melt adhesive composition can then be applied to the appropriate substrate using a variety of methods including spray coating, film extrusion, multi-line extrusion, multi-dot extrusion and the like.

The pressure sensitive adhesives of the present invention must have aggressive tack and good peel and shear strength. Importantly, the adhesives must also have excellent high temperature strength. Typically, the high temperature strength is measured as the shear adhesion failure temperature (SAFT, ASTM D4498). The adhesives of the present invention typically are characterized by SAFT values greater than 60° C. Preferably, the SAFT value is greater than 70° C., more preferably greater than 80° C., and most preferably greater than 90° C.

The adhesive compositions of the present invention are useful for pressure sensitive labels and decals. A wide variety of materials are useful as label and decal stocks and any paper or film material with suitable printability, cuttability, stiffness and adhesive coatability is satisfactory. Typical label and decal stocks include paper, polyolefin films including polyethylene, polypropylene and ethylene-propylene copolymers, polyester films, plasticized poly(vinyl chloride) films, and the like. Plasticized poly(vinyl chloride) films are especially preferred as a decal stock.

EXAMPLES

The following examples are provided to illustrate the present invention. The examples are not intended to limit the scope of the present invention and they should not be so interpreted. Amounts are in weight parts or weight percentages unless otherwise indicated. The test methods used in the examples are American Society for Testing Materials (ASTM) test methods, and the following specific methods were used:

| | |
|---|---|
| Rolling Ball Tack | ASTM D-3121 |
| Polyken Probe Tack | ASTM D-2979 |
| Loop Tack | ASTM D-6195 |
| 180° Peel | ASTM D-903 |
| Holding Power | ASTM D-6463 |
| SAFT | ASTM D-4498 |
| Melt Viscosity | ASTM D-3236 |

Materials

Polymer A represents the block copolymer composition of the present invention. Polymer A is a mixture of a coupled, linear triblock copolymer having the structure $(A-B)_2X$ and a diblock copolymer component having the structure A-B. In both the triblock and diblock copolymer components, A is a polystyrene block having an apparent molecular weight of 36,000. Because GPC with polystyrene standards was used to measure the molecular weights, the true molecular weight of the A block is equal to the apparent molecular weight. In both the triblock and diblock copolymer components, B is a polybutadiene block having a vinyl content of about 10 mol % and an apparent molecular weight of 164,000. The true molecular weight of the B block is 84,000. Because the triblock component is a coupled polymer it has a structure of apparent molecular weight 36,000–328,000–36,000 while the corresponding structure of the diblock component is 36,000–164,000. The overall styrene content is about 30% by weight. The triblock component makes up 20% by weight of the block copolymer composition with the remainder (80%) being the diblock component.

Comparative Polymer 1 is a coupled, linear block copolymer composition having 22% by weight of a triblock component $(A-B)_2X$ and 78% by weight of a diblock component A-B. The A block of each component is a polystyrene block having a true molecular weight of 16,100. The B block of each component is a polybutadiene block having a vinyl content of about 10 mol % and a true molecular weight of 36,000. The overall styrene content is about 31% by weight.

Comparative Polymer 2 is a coupled, linear block copolymer composition having 84% by weight of a triblock component $(A-B)_2X$ and 16% by weight of a diblock component A-B. The A block of each component is a polystyrene block having a true molecular weight of 16,100. The B block of each component is a polybutadiene block having a vinyl content of about 10 mol % and a true molecular weight of 35,800. The overall styrene content is about 31% by weight.

Comparative Polymer 3 is a coupled, linear block copolymer composition having 82% by weight of a triblock component $(A-B)_2X$ and 18% by weight of a diblock component A-B. The A block of each component is a polystyrene block having a true molecular weight of 15,500. The B block of each component is a polyisoprene block having a vinyl content of about 6 mol % and a true molecular weight of 55,000. The overall styrene content is about 22% by weight.

Example 1

Adhesive formulations I–III were made according to the listing of ingredients in Table B. Adhesives ranging in block copolymer content from 20–40 parts by weight exhibited the desired cohesive failure during room temperature 180° peel tests and excellent high temperature performance as shown by the SAFT results.

TABLE B

| | Adhesive Formulation | | | | | |
|---|---|---|---|---|---|---|
| | C1 | C2 | C3 | I | II | III |
| Composition, pbw | | | | | | |
| Comparative Polymer 1 | 40.0 | 30.0 | 20.0 | 0 | 0 | 0 |
| Polymer A | 0 | 0 | 0 | 40.0 | 30.0 | 20.0 |
| WINGTACK 86 | 50.0 | 50.0 | 50.0 | 50.0 | 50.0 | 50.0 |
| SHELLFLEX 371 | 10.0 | 20.0 | 30.0 | 10.0 | 20.0 | 30.0 |
| IRGANOX 1010 | 0.5 | 0.5 | 0.5 | 0.5 | 0.5 | 0.5 |
| Properties | | | | | | |
| Rolling Ball Tack, cm | 3.2 | 0.8 | 0.7 | 3 | 1.3 | 0.8 |
| Polyken Probe Tack, kg | 0.69 | 0.53 | 0.45 | 0.27 | 0.43 | 0.36 |
| Loop Tack, oz/in | 139 vsc | 115 vsc | 72 sc | 124 vsc | 100 vsc | 67 c |
| 180° Peel, pli | 5.1 c | 3.7 c | 2.6 c | 3.6 c | 3.1 c | 3.6 c |
| HP to Steel (1 × 1, 2 kg), min | >5000 | >5000 | >5000 | >5000 | >5000 | >5000 |
| SAFT to Mylar (1 × 1, 0.5 kg), ° C. | 90 | 80 | 70 | 122 | 97 | 82 | c indicates cohesive failure, or splitting, of the adhesive layer.
sc indicates slight cohesive failure.
vsc indicates very slight cohesive failure.

The comparative formulations C1–C3 were made from Comparative Polymer 1 which has a low coupling efficiency but also relatively low molecular weight. The resulting high temperature performance (SAFT) is significantly less than the inventive formulations at all block copolymer composition contents.

Example 2

Adhesive formulations IV–VI were made according to the listing of ingredients in Table C. The formulations were made by blending a highly coupled, but relatively low molecular weight block copolymer composition, Comparative Polymer 2, with Polymer A. Blends containing up to 40% of Comparative Polymer 2 (IV–VI) retained both good high temperature performance (SAFT) and in 180° peel tests failed in the desired cohesive mode. Higher levels of Comparative Polymer-2 (C4–C5), including Comparative Polymer 2 alone (C6), did not yield the desired cohesive failure mode of the adhesive in peel tests.

TABLE C

| | Adhesive Formulation | | | | | |
|---|---|---|---|---|---|---|
| | IV | V | VI | C4 | C5 | C6 |
| Composition, pbw | | | | | | |
| Polymer A | 30.0 | 24.0 | 18.0 | 12.0 | 6.0 | |
| Comparative Polymer 2 | | 6.0 | 12.0 | 18.0 | 24.0 | 30.0 |
| WINGTACK 86 | 50.0 | 50.0 | 50.0 | 50.0 | 50.0 | 50.0 |
| SHELLFLEX 371 | 20.0 | 20.0 | 20.0 | 20.0 | 20.0 | 20.0 |
| IRGANOX 1010 | 0.5 | 0.5 | 0.5 | 0.5 | 0.5 | 0.5 |
| Overall coupling efficiency, % | 20 | 33 | 46 | 58 | 71 | 84 |
| Properties on 1 mil Mylar | | | | | | |
| 180° Peel, pli | 3.3 c | 6.1 c | 8.0 c | 3.8 | 3.5 | 3.7 |
| HP to Steel (1 × 1, 2 kg), min | >5000 | >5000 | >5000 | >5000 | >5000 | >5000 |
| SAFT to Mylar (1 × 1, 0.5 kg), °C. | 94 | 96 | 97 | 96 | 99 | 98 | c indicates cohesive failure, or splitting, of the adhesive layer.

Example 3

Adhesive formulations VII and VIII were made according to the listing of Table D. The adhesive formulations contained relatively low amounts of Polymer A. At block copolymer composition levels as low as 11% good high temperature results (SAFT) and the desired cohesive failure during 180° peel tests were exhibited. The inventive compositions were compared to formulations containing Comparative Polymer 3 having a high level of triblock component and relatively low molecular weight. While the desired cohesive failure was observed in Comparative Formulations C7 and C8, the high temperature performance (SAFT) was significantly poorer than that of the inventive formulations (VII and VIII) at equivalent block copolymer composition contents.

TABLE D

| | Adhesive Formulations | | | |
|---|---|---|---|---|
| | C7 | C8 | VII | VIII |
| Composition, pbw | | | | |
| Comparative Polymer 3 | 11 | 15 | 0 | 0 |
| Polymer A | 0 | 0 | 11 | 15 |

TABLE D-continued

| | Adhesive Formulations | | | |
|---|---|---|---|---|
| | C7 | C8 | VII | VIII |
| ESCOREZ 5600 | 64 | 64 | 64 | 64 |
| TUFFLO 6056 | 25 | 21 | 25 | 21 |
| IRGANOX 1010 | 0.25 | 0.25 | 0.25 | 0.25 |
| Properties | | | | |
| Rolling Ball Tack, cm | >30 | >30 | >30 | >30 |
| Polyken Probe Tack, kg | 1.29 | 1.85 | 1.34 | 1.43 |
| LoopTack, oz/in | 166 c | 209 c | 217 c | 207 c |
| 180° Peel, pli | 4.7 c | 5.7 c | 4.5 c | 5.4 c |
| HP to Steel (1 × 1, 2 kg), min | >6000 | >6000 | >6000 | >6000 |
| SAFT (1 × 1 0.5 kg), °C. | 63 | 68 | 71 | 76 |

TABLE D-continued

| | Adhesive Formulations | | | |
|---|---|---|---|---|
| | C7 | C8 | VII | VIII |
| Melt Viscosity, cps | | | | |
| @ 300° F. | 1,100 | 2,600 | 6,200 | 34,000 |
| @ 265° F. | 2,400 | 6,200 | 44,000 | 300,000 | c indicates cohesive failure, or splitting, of the adhesive layer.

Example 4

Adhesive formulations IX–XII were made according to the listing of ingredients in Table E. In this example, inventive formulations were made comprising Santicizer 160, an ester-type plasticizer. Surprisingly, the adhesives maintained excellent tack, peel, holding power and SAFT results at plasticizer levels up to 15% by weight. The SAFT value for the comparative formulation, C7, made with Comparative Polymer 1 becomes marginal when the concentration of the ester-type plasticizer reaches only 5% by weight.

TABLE E

|  | IX | X | XI | XII | C9 |
|---|---|---|---|---|---|
| Composition, pbw |  |  |  |  |  |
| Polymer A | 25 | 25 | 25 | 25 | 0 |
| Comparative Polymer 1 | 0 | 0 | 0 | 0 | 25 |
| ESCOREZ 5600 | 60 | 60 | 60 | 60 | 60 |
| TUFFLO 6056 | 15 | 10 | 5 | 0 | 10 |
| SANTICIZER 160 |  | 5 | 10 | 15 | 5 |
| IRGANOX 1010 | 0.25 | 0.25 | 0.25 | 0.25 | 0.25 |
| PSA Properties |  |  |  |  |  |
| Melt Vis @ 177° C., Pa.s | 190 | 140 | 120 | 95 |  |
| Rolling Ball Tack, cm | >30 | 10 | >30 | >30 | >30 |
| Polyken Probe Tack, kg | 1.06 c | 1.00 c | 1.00 c | 0.86 c | 1.16 c |
| Loop Tack, oz/in | 290 c | 310 c | 260 c | 210 c | 210 c |
| 180° Peel, pli | 6.5 c | 6.5 c | 6.4 c | 7.4 c | 5.2 c |
| HP to Steel (1 × 1, 2 kg), min | >6000 | >6000 | 310 | 100 | 1450 |
| SAFT (1 × 1, 0.5 kg), ° C. | 87 c | 76 c | 69 c | 64 c | 61 c | c indicates cohesive failure, or splitting, of the adhesive layer.

What is claimed:

1. A pressure sensitive adhesive composition comprising from 10 to 45 parts by weight of a block copolymer composition, from 40 to 70 parts by weight of a tackifier, from 5 to 40 parts by weight of an extending oil, and from 5 to 15 parts by weight of an ester-type plasticizer, said block copolymer composition comprising:
   i) from 5 to 70% by weight basis the total weight of the block copolymer composition of a first block copolymer selected from linear styrenic block copolymers (SBC1), radial styrenic block copolymers (SBC2) and mixtures thereof, wherein:
      (1) said linear block copolymer comprises at least two polymer blocks each substantially made of an aromatic vinyl compound and at least one polymer block substantially made of a conjugated diene compound and having an apparent molecular weight greater than 250,000 and;
      (2) said radial styrenic block copolymer has three or more polymer arms attached to the residue of a coupling agent or multifunctional compound, and comprises at least two polymer blocks each substantially made of an aromatic vinyl compound and at least one polymer block substantially made of a conjugated diene compound and wherein the polymer anus have an average apparent molecular weight greater than 125,000 and
   ii) from 95 to 30% by weight basis the total weight of the block copolymer composition of a second block copolymer (D1) having an apparent molecular weight of 120,000 to 250,000, comprising a styrenic diblock copolymer having one polymer block substantially made of an aromatic vinyl compound and one polymer block substantially made of a conjugated diene compound.

2. The pressure sensitive adhesive composition according to claim 1 wherein said aromatic vinyl compound is styrene and said conjugated diene is selected from the group consisting of isoprene and butadiene.

3. The pressure sensitive adhesive composition according to claim 2 wherein said conjugated diene is butadiene, and wherein about 10 to about 80 mol percent of the condensed butadiene units in block B have 1,2-configuration.

4. The pressure sensitive adhesive composition according to claim 3 wherein the first block copolymer has an apparent molecular weight of 200,000 to 400,000 if said copolymer is a linear polymer, or 300,000 to 1,500,000 if said copolymer is a radial or star polymer.

5. The pressure sensitive adhesive composition according to claim 4 wherein the first block copolymer is selected from the group consisting of those of the formulae $(B)_p\text{-}(A\text{-}B)_2X$; or $(B)_p\text{-}A(B\text{-}A)_n\text{-}(B)_p$, (linear SBC1)

$((B)_p(A\text{-}B)_n)_mX$ (radial SBC2)

wherein A represents a polystyrene block; B represents a polymer block of a conjugated diene, n is an integer greater than or equal to 1, m is an integer greater than 2, p is 0 or 1, and X is the residue of a coupling agent or multifunctional monomer.

6. The pressure sensitive adhesive composition according to claim 2 wherein the first block copolymer and the second block copolymer may be used in relative amounts of 15 to 70% by weight (SBC1 and/or SBC2) and 85 to 30% by weight (D1).

7. The pressure sensitive adhesive composition according to claim 3 wherein said first block copolymer is an $(A\text{-}B)_nX$ block copolymer where n is an integer from 2 to about 8, X is a coupling agent residue, each A block has an average apparent molecular weight of about 30,000 to about 40,000, each B block has an average apparent molecular weight of about 150,000 to about 170,000, and the total styrene content in the block copolymer composition is between about 15 weight percent and about 40 weight percent.

8. The pressure sensitive adhesive composition according to claim 7 wherein the amount of the first block copolymer is 20 to 50% by weight and the amount of the second block copolymer D1 is 80 to 50% by weight, where D1 is an A-B diblock where the A block has an average apparent molecular weight of about 30,000 to about 40,000 and the B block has an avenge apparent molecular weight of about 150,000 to about 170,000.

9. The pressure sensitive adhesive composition according to claim 1 wherein said extending oil is a paraffinic/naphthenic processing oil.

10. The pressure sensitive adhesive composition according to claim 9 wherein the amount of extending oil is from 10 to 30 parts by weight.

11. The pressure sensitive adhesive composition according to claim 1 wherein the amount of tackifier is from 45 to 60 parts by weight.

12. The pressure sensitive adhesive composition according to claim 11 wherein said tackifier is compatible with the B block and is selected from the group consisting of $C_5$ hydrocarbon resins, hydrogenated $C_9$ hydrocarbon resins, rosin esters, and styrenated terpene resins.

13. The pressure sensitive adhesive composition according to claim 11 wherein said tackifier is compatible with the A block and is selected from the group consisting of coumarone-indene rosin, polyindene resin, poly(methyl indene) resin, polystyrene resin, vinyltoluene-alphamethylstyrene resin, alphamethylstyrene resin and polyphenylene ether.

14. The pressure sensitive adhesive composition according to claim 1 wherein the first block copolymer is a linear block copolymer having the structure $(A\text{-}B)_2X$.

15. The pressure sensitive adhesive composition according to claim 1 wherein said plasticizer is selected from the group consisting of dioctyl phthalate, di-2-ethylhexyl phthalate, di-isononyl phthalate, di-isodecyl phthalate and butyl benzyl phthalate.

16. The pressure sensitive adhesive composition according to claim 1 having a SAFT value greater than 70° C.

17. The pressure sensitive adhesive composition according to claim 1 having a SAFT value greater than 80° C.

18. The pressure sensitive adhesive composition according to claim 1 having a SAFT value greater than 90° C.

19. A die-cuttable label comprising the pressure sensitive adhesive composition of claim 1 and a label stock film or paper.

20. The die-cuttable label of claim 19 wherein the label stock film is selected from the group consisting of polyolefin films, polyester, and plasticized poly(vinyl chloride) films.

21. A die-cuttable decal comprising the pressure sensitive adhesive composition of claim 1 and a decal stock film.

22. The die-cuttable decal of claim 21 wherein the decal stock film is a plasticized poly(vinyl chloride) film.

* * * * *

UNITED STATES PATENT AND TRADEMARK OFFICE
CERTIFICATE OF CORRECTION

PATENT NO.         : 7,297,741 B2                                         Page 1 of 1
APPLICATION NO. : 10/880055
DATED              : November 20, 2007
INVENTOR(S)        : David J. St. Clair et al.

It is certified that error appears in the above-identified patent and that said Letters Patent is hereby corrected as shown below:

Claim 1, Column 11, line 49 delete "anus" and insert --arms--.

Signed and Sealed this

Twenty Second Day of April, 2008

JON W. DUDAS
*Director of the United States Patent and Trademark Office*